United States Patent
Gehring et al.

(12) 
(10) Patent No.: US 6,739,742 B2
(45) Date of Patent: May 25, 2004

(54) OVERHEAD STORAGE APPARATUS FOR VEHICLES

(75) Inventors: Thomas F.J. Gehring, Ontario (CA); Dejan Havidic, Toronto (CA); Ireneusz Jankowski, Ontario (CA); Per Erlandsson, Skara (SE); Oivind Nilsrud, Skara (SE)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/324,458

(22) Filed: Dec. 20, 2002

(65) Prior Publication Data

US 2003/0156421 A1 Aug. 21, 2003

Related U.S. Application Data

(60) Provisional application No. 60/358,543, filed on Feb. 21, 2002.

(51) Int. Cl.[7] .................................................. B60Q 1/00
(52) U.S. Cl. ..................... 362/490; 362/496; 362/479; 362/154; 296/57.7; 224/309
(58) Field of Search ............................ 362/490, 496, 362/479, 154; 296/57.7, 37.8; 224/309

(56) References Cited

U.S. PATENT DOCUMENTS

| | | | | |
|---|---|---|---|---|
| 1,964,339 A | * | 6/1934 | Brassell | |
| 4,241,870 A | | 12/1980 | Marcus | 296/37.7 |
| 4,469,365 A | * | 9/1984 | Marcus et al. | 296/37.7 |
| 4,628,417 A | * | 12/1986 | Kaminski et al. | 362/74 |
| 4,867,498 A | | 9/1989 | Delphia et al. | 296/37.7 |
| 5,466,028 A | | 11/1995 | Nicopolis | 296/37.7 |
| 5,522,638 A | * | 6/1996 | Falcoff et al. | 296/37.8 |
| 6,003,925 A | | 12/1999 | Litke et al. | 296/37.8 |
| 6,062,623 A | | 5/2000 | Lemmen | 296/37.8 |
| 6,125,030 A | | 9/2000 | Mola et al. | 361/681 |
| 6,135,528 A | | 10/2000 | Sobieski et al. | 296/37.7 |
| 6,146,578 A | | 11/2000 | Van Ert et al. | 264/510 |
| 6,176,536 B1 | | 1/2001 | Miller et al. | 296/37.7 |
| 6,267,428 B1 | | 7/2001 | Baldas et al. | 296/37.7 |
| 6,276,737 B1 | | 8/2001 | Cansfield et al. | 296/37.8 |
| 6,328,191 B1 | | 12/2001 | Conley et al. | 224/563 |
| 6,331,026 B1 | * | 12/2001 | Adsit et al. | 296/37.7 |
| 6,513,959 B2 | * | 2/2003 | Serizawa et al. | 362/490 |

* cited by examiner

*Primary Examiner*—Alan Cariaso
*Assistant Examiner*—Jacob Y. Choi
(74) *Attorney, Agent, or Firm*—Myers Bigel Sibley & Sajovec

(57) ABSTRACT

Storage apparatus are provided that are configured to be attached to the interior roof of a vehicle. A panel is configured to be secured to a vehicle interior roof and includes an aperture formed therein that is configured to allow an interior light attached to the interior roof of a vehicle to extend therethrough. The cover is configured to be movable between a closed position in face-to-face adjacent relationship with the panel and an open position for providing access to the one or more storage compartments. The cover includes an aperture formed therein. When the cover is in a closed position, the vehicle interior roof light can illuminate the vehicle interior through the aperture and lens in the cover. When the cover is moved to an open position, the light can also illuminate the one or more storage compartments in the cover.

30 Claims, 3 Drawing Sheets

US 6,739,742 B2

OVERHEAD STORAGE APPARATUS FOR VEHICLES

RELATED APPLICATION

This application claims the benefit of U.S. Provisional Application No. 60/358,543, filed Feb. 21, 2002, the disclosure of which is incorporated herein by reference in its entirety as if set forth fully herein.

FIELD OF THE INVENTION

The present invention relates generally to vehicles and, more particularly, to storage apparatus for use within vehicles.

BACKGROUND OF THE INVENTION

Motor vehicles are typically provided with a cargo storage compartment of some type. For example, sedan-style automobiles are conventionally equipped with a trunk. Sport/utility vehicles, mini-vans, and other vehicles in which there are two or more rows of seating, are conventionally provided with a cargo storage area behind the last row of seating. Items carried within vehicle cargo storage areas are often free to move about during vehicle operation, which may be undesirable. In addition, in vehicles such as sport/utility vehicles and mini-vans, cargo storage space may be somewhat limited. Accordingly, a need exists to maximize the efficiency and utilization of existing cargo storage space without intruding on passenger space. In addition, a need exists to restrain items from moving about in vehicle cargo storage areas during vehicle operation.

SUMMARY OF THE INVENTION

In view of the above discussion, storage apparatus that are configured to be attached to a vehicle interior roof are provided. According to embodiments of the present invention, an overhead storage apparatus includes a panel that is configured to be secured directly to a vehicle interior roof (e.g., directly through a headliner via screws and/or other fastening devices). The panel includes an aperture formed therein that is configured to allow an interior light attached to the interior roof of a vehicle to extend therethrough. According to embodiments of the present invention, an interior light may be attached to the panel. A cover is configured to be pivotally mounted to the panel and includes one or more storage compartments on the side of the cover facing the panel.

The cover is configured to be movable about a substantially horizontal axis between a closed position in face-to-face adjacent relationship with the panel and an open position for providing access to the one or more storage compartments. The cover includes an aperture formed therein. A translucent lens is disposed within the cover aperture. Accordingly, when the cover is in a closed position, the vehicle interior roof light can illuminate the vehicle interior through the aperture and lens in the cover. When the cover is moved to an open position, the light can also illuminate the one or more storage compartments in the cover.

According to embodiments of the present invention, an overhead storage apparatus cover and/or the panel may include one or more projections extending therefrom that are configured to support articles (e.g., shopping bags, etc.) suspended therefrom.

According to embodiments of the present invention, an overhead storage apparatus cover and/or panel may include thermal insulation material such that one or more compartments in the cover can serve as a food and/or beverage cooler.

According to embodiments of the present invention, an overhead storage apparatus that is configured to be attached to a vehicle interior roof includes a first panel, a second panel, and a cover pivotally secured to the second panel. The first panel is configured to be positioned between the interior roof of a vehicle and a headliner that is secured to the interior roof. The second panel is configured to be attached to the first panel in face-to-face adjacent relationship such that the vehicle headliner is sandwiched therebetween. The cover is pivotally mounted to the second panel and includes one or more storage compartments on a side of the cover facing the second panel. The cover is movable about a substantially horizontal axis between a closed position in face-to-face adjacent relationship with the second panel and an open position for providing access to the one or more storage compartments.

Overhead storage apparatus according to embodiments of the present invention can provide a secure way to store items within vehicles and can provide additional cargo storage space without intruding on passenger space. Moreover, cargo storage apparatus according to embodiments of the present invention may be lightweight and may be designed for easy installation on new and existing vehicles.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
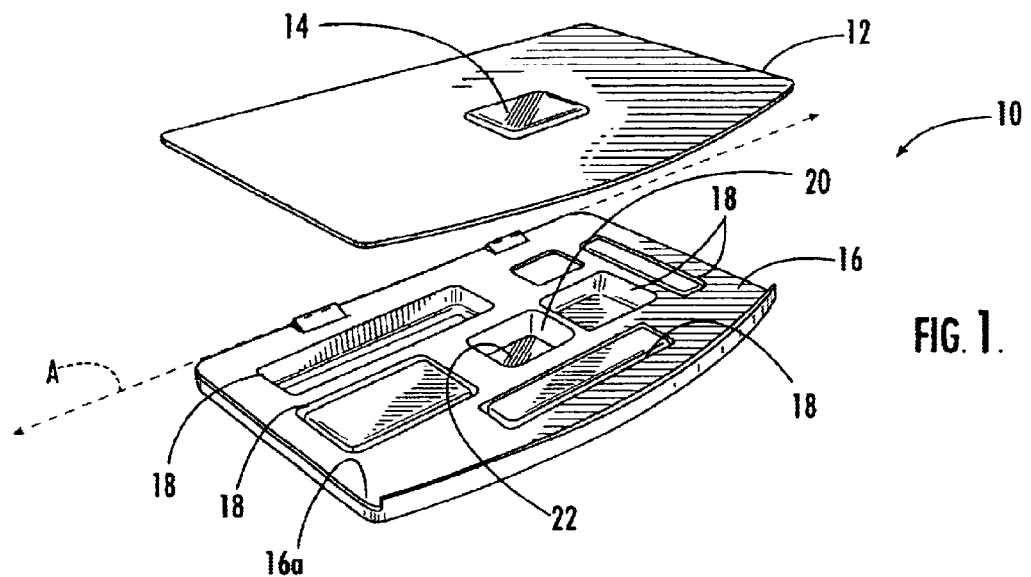
FIG. 1 is an exploded perspective view of an overhead storage apparatus according to embodiments of the present invention.

Referring now to FIG. 1, an overhead storage apparatus 10 that is configured to be attached to a vehicle interior roof, according to embodiments of the present invention, is illustrated. The illustrated overhead storage apparatus 10 includes a panel 12 that is configured to be secured directly to a vehicle interior roof. For example, the overhead storage apparatus 10 may be placed directly on a headliner and fastened to the interior roof via fasteners (e.g., screws, bolts, rivets, etc.) that extend through the headliner. The illustrated panel 12 includes an aperture 14 formed therein that is configured to allow an interior light attached to the interior roof of a vehicle extend therethrough. A cover 16 is configured to be pivotally mounted to the panel 12 and includes one or more storage compartments 18 on the side 16a of the cover 16 facing the panel 12, as illustrated.

The cover 16 is configured to be movable about a substantially horizontal axis A between a closed position in face-to-face adjacent relationship with the panel 12 and an open position for providing access to the one or more storage compartments 18. The cover 16 includes an aperture 20 formed therein, as illustrated. A translucent lens 22 is disposed within the second aperture. Accordingly, when the cover 16 is in a closed position, the light attached to the interior roof of a vehicle can illuminate the interior through the aperture and lens in the cover. When the cover 16 is moved to an open position, the light can also illuminate the one or more storage compartments 18 in the cover 16.

It is not required that the cover 16 be movable about a substantially horizontal axis A. The cover 16 may be movable about a non-horizontal axis.

Figure 2:
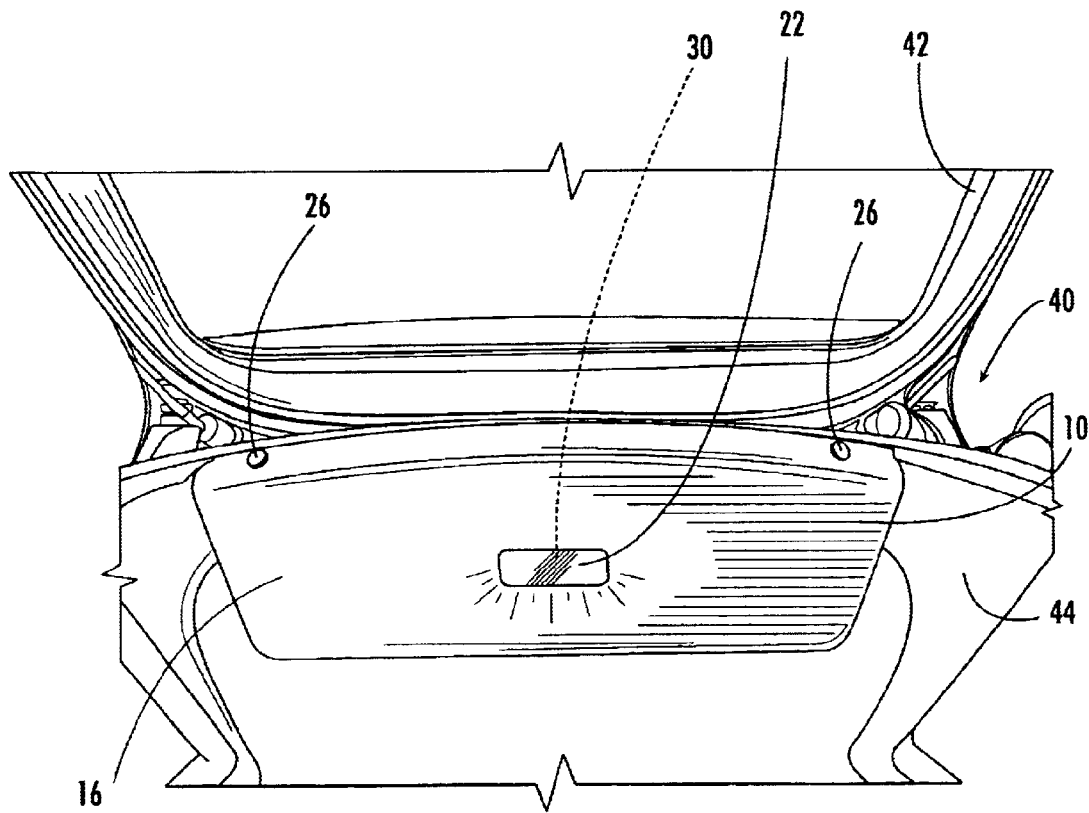
FIG. 2 illustrates the overhead storage apparatus of FIG. 1 installed within a vehicle and with the cover in the closed position.
Figure 3:
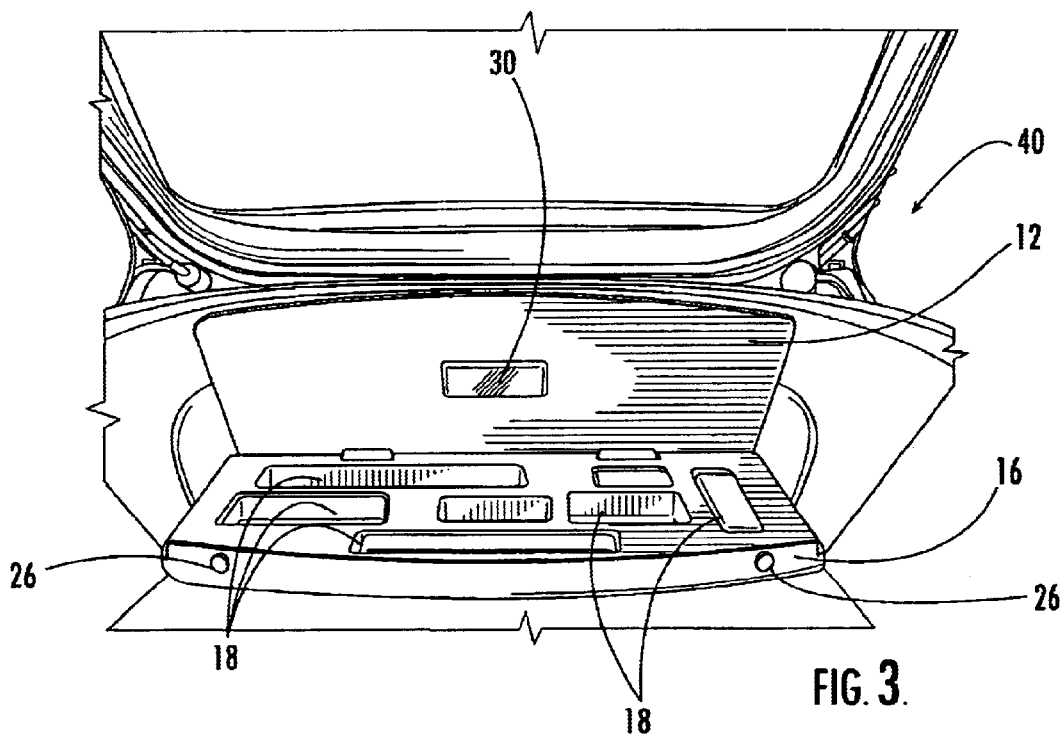
FIG. 3 illustrates the overhead storage apparatus of FIG. 1 installed within a vehicle and with the cover in the open position.

FIGS. 2–3 illustrate the overhead storage apparatus 10 of FIG. 1 installed within a vehicle 40. The illustrated overhead storage apparatus 10 is attached to the vehicle interior roof 44 towards the rear of the vehicle 40 adjacent the rear door or hatch 42. In FIG. 2, the cover 16 of the overhead storage apparatus 10 is in the closed position. As illustrated, a light 30 is capable of illuminating the interior of the vehicle via the lens 22 and aperture 20 in the cover 16. FIG. 3 illustrates the overhead storage apparatus 10 of FIG. 1 with the cover 16 in the open position. As illustrated, the light 30, which extends through the aperture 14 in the panel 12 is capable of illuminating compartments 18 in the cover 16. According to embodiments of the present invention, the light 30 may extend through the aperture 20 in the cover 16 without requiring a lens in the cover 16.

In the illustrated embodiment of FIG. 2, the cover 16 includes a pair of latches 26 that are configured to releasably maintain the cover 16 in the closed position. Various types and configurations of latches may be utilized without limitation. Moreover, latches utilized in accordance with embodiments of the present invention may include one or more locking mechanisms that are configured to prevent unauthorized release of the latches. Latches and locking mechanisms therefor are well known to those skilled in the art and need not be described further herein.

Figure 4:
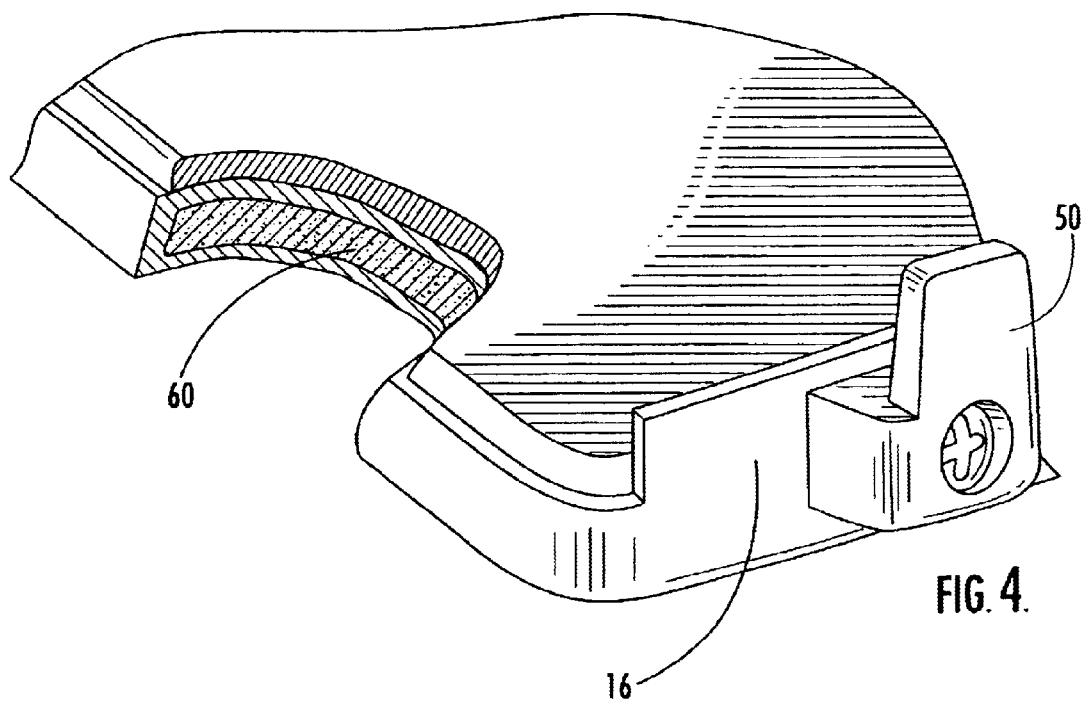
FIG. 4 illustrates an overhead storage apparatus according to additional embodiments of the present invention.

According to embodiments of the present invention illustrated in FIG. 4, the cover 16 and/or the panel 12 may include one or more projections 50 extending therefrom that are configured to support articles (e.g., shopping bags, etc.) suspended therefrom. Various types and numbers of projections 50 may be utilized.

According to embodiments of the present invention illustrated in FIG. 4, the cover 16 and/or panel 12 may include thermal insulation material 60 such that the one or more compartments 18 can serve as a food or beverage cooler. In addition, the cover 16 and or panel 12 may be formed from thermal insulating material. Various types of thermal insulation material may be utilized. Thermal insulating materials are well understood by those and need not be described further herein.

Figure 5:
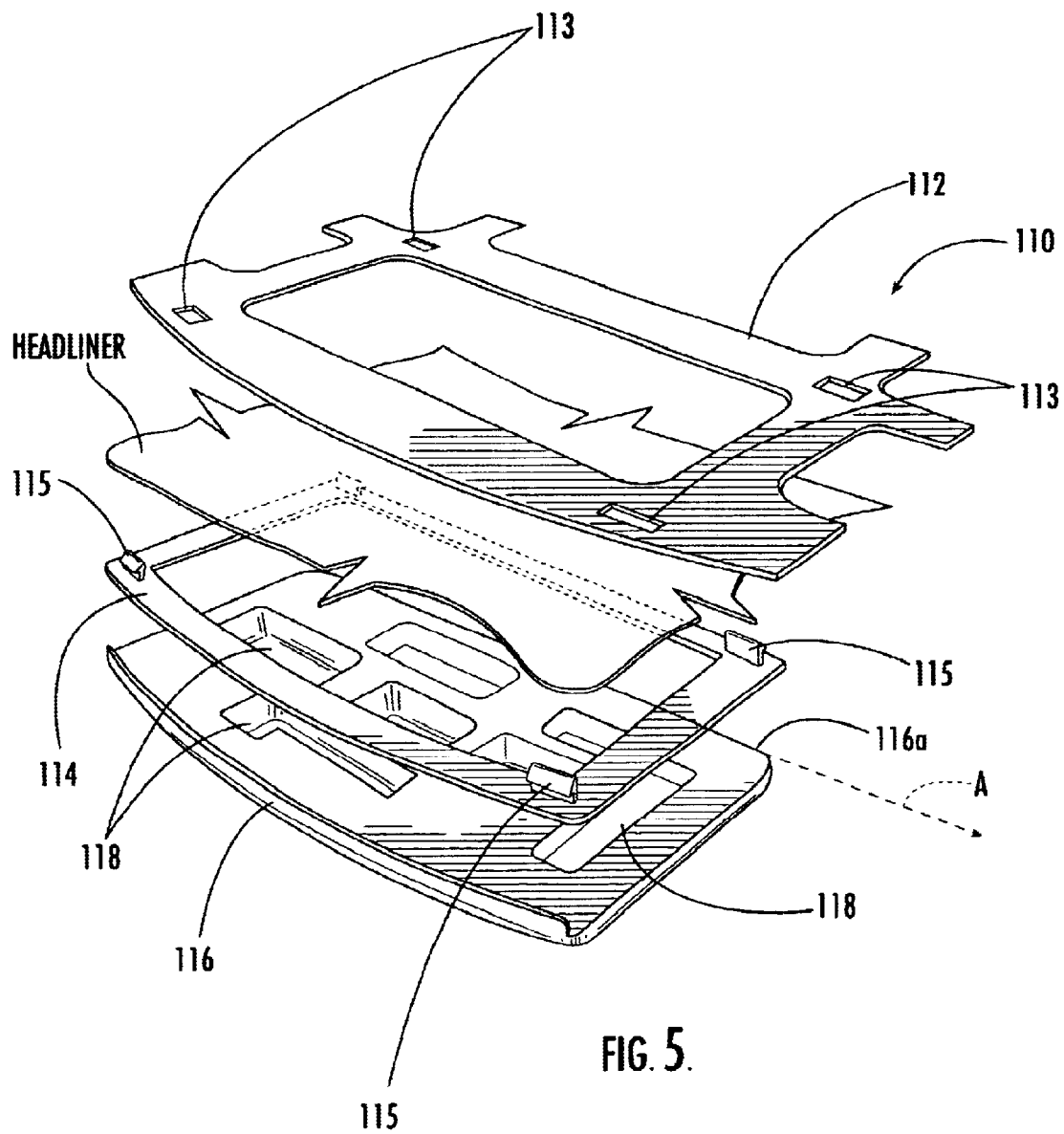
FIG. 5 is an exploded perspective view of an overhead storage apparatus according to embodiments of the present invention.

Referring to FIG. 5, an overhead storage apparatus 110 that is configured to be attached to a vehicle interior roof, according to embodiments of the present invention, is illustrated. The illustrated overhead storage apparatus 110 includes a first panel 112, second panel 114, and cover, 116. The first panel 112 is configured to be positioned between the interior roof of a vehicle and a headliner that is secured to the interior roof, or otherwise supported within a vehicle. The second panel 114 is configured to be attached to the first panel in face-to-face adjacent relationship such that a vehicle headliner is sandwiched therebetween. Accordingly, the headliner supports the overhead storage apparatus 110. The size of the overhead storage apparatus 110 and the weight capacity for articles stored therewithin is dependent upon the type and strength of the headliner.

In the illustrated embodiment, the first panel 112 includes a plurality of apertures 113 formed therein that are configured to receive tabs 115 extending from the second panel 114. The tabs 115 are configured to retain the second panel in face-to-face relationship with the first panel 112 when inserted into the apertures 113. Various ways of securing the second panel 114 to the first panel 112 may be utilized (e.g., screws, bolts, rivets, etc.), however. Embodiments of the present invention are not limited to the illustrated tabs 115 and apertures 113.

The cover 116 is pivotally mounted to the second panel 114 and includes one or more storage compartments 118 on a side 116a of the cover 116 facing the second panel 114. The cover 116 is movable about a substantially horizontal axis A between a closed position in face-to-face adjacent relationship with the second panel 114 and an open position for providing access to the one or more storage compartments 118, as described above.

The embodiment of FIG. 5 may also include an aperture in the cover 116 that allows an interior roof light to illuminate a vehicle interior therethrough as described above with respect to FIGS. 1–3.

Overhead storage apparatus according to embodiments of the present invention may have various shapes and configurations and are not limited to the illustrated embodiments. For example, the panels 12, 112, 114, covers 16, 116 and compartments 18, 118 of the various illustrated embodiments may have various shapes, sizes and configurations. In addition, overhead storage apparatus according to embodiments of the present invention may be positioned in various overhead locations within a vehicle and within various types of vehicles. Multiple overhead storage apparatus also may be utilized.

It is understood that overhead storage apparatus according to the present invention may incorporate various combinations of the above-described embodiments. The present invention is not limited to the exact illustrated embodiments.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. An overhead storage apparatus for a vehicle, comprising:
    a first panel configured to be positioned between an interior roof of a vehicle and a headliner that is secured to the interior roof;
    a second panel configured to be attached to the first panel in face-to-face adjacent relationship such that the headliner is sandwiched therebetween; and a cover hingedly mounted to the second panel and comprising one or more storage compartments on a side of the cover facing the second panel, wherein the cover is movable between a closed position in face-to-face adjacent relationship with the second panel and an open position for providing access to the one or more storage compartments.

2. The overhead storage apparatus of claim 1, wherein the cover comprises a latch that is configured to releasably maintain the cover in the closed position.

3. The overhead storage apparatus of claim 1, wherein the second panel comprises a first aperture formed therein that is configured to allow a light mounted to a vehicle interior roof extend therethrough.

4. The overhead storage apparatus of claim 3, wherein the cover comprises a second aperture formed therein and wherein the cover is pivotally mounted to the second panel such that the light can illuminate the interior of a vehicle when the cover is in the closed position, and such that the light can illuminate the one or more storage compartments in the cover when the cover is in the open position.

5. The overhead storage apparatus of claim 3, wherein the cover comprises a second aperture formed therein and wherein the cover is pivotally mounted to the second panel such that the light can extend through the second aperture when the cover is in the closed position.

6. The overhead storage apparatus of claim 4, wherein the cover comprises a translucent lens disposed within the second aperture.

7. The overhead storage apparatus of claim 1, wherein the cover comprises one or more projections extending therefrom, wherein each projection is configured to support articles suspended therefrom.

8. The overhead storage apparatus of claim 1, wherein the cover comprises thermal insulation material such that the one or more storage compartments therein can serve as a cooler.

9. An overhead storage apparatus for a vehicle, comprising:
   a panel configured to be secured to a vehicle interior roof, wherein the interior roof includes a light that is configured to illuminate an interior of the vehicle, wherein the panel comprises a first aperture formed therein, and wherein the panel is configured to be attached to the vehicle interior roof such that the light extends through the first aperture; and
   a cover pivotally mounted to the panel and comprising one or more storage compartments on a side of the cover facing the panel, wherein the cover is movable between a closed position in face-to-face adjacent relationship with the panel and an open position for providing access to the one or more storage compartments, wherein the cover comprises a second aperture formed therein, wherein the light can illuminate the vehicle interior through the second aperture when the cover is in the closed position, and wherein the light can illuminate the one or more storage compartments in the cover when the cover is in the open position.

10. The overhead storage apparatus of claim 9, wherein the cover comprises a translucent lens disposed within the second aperture.

11. The overhead storage apparatus of claim 9, the light can extend through the second aperture when the cover is in the closed position.

12. The overhead storage apparatus of claim 9, wherein the cover comprises a latch that is configured to releasably maintain the cover in the closed position.

13. The overhead storage apparatus of claim 9, wherein the cover comprises one or more projections extending therefrom, wherein each projection is configured to support articles suspended therefrom.

14. The overhead storage apparatus of claim 9, wherein the cover comprises thermal insulation material such that the one or more storage compartments therein can serve as a food and/or beverage cooler.

15. An overhead storage apparatus for a vehicle, comprising:
   a panel configured to be secured to a vehicle interior roof;
   a light attached to the panel; and
   a cover pivotally mounted to the panel and comprising one or more storage compartments on a side of the cover facing the panel, wherein the cover is movable between a closed position in face-to-face adjacent relationship with the panel and an open position for providing access to the one or more storage compartments, wherein the cover comprises an aperture formed therein, and wherein the cover is pivotally mounted to the panel such that the light illuminates the vehicle interior through the aperture when the cover is in the closed position and illuminates the one or more storage compartments in the cover when the cover is in the open position.

16. The overhead storage apparatus of claim 15, wherein the cover comprises a translucent lens disposed within the second aperture.

17. The overhead storage apparatus of claim 15, wherein the light extends through the aperture when the cover is in the closed position.

18. A vehicle, comprising:
   an interior roof having a headliner attached thereto; and
   an overhead storage apparatus attached to the interior roof, comprising:
      a first panel positioned between the interior roof and headliner;
      a second panel attached to the first panel in face-to-face adjacent relationship such that the headliner is sandwiched therebetween; and
      a cover hingedly mounted to the second panel and comprising one or more storage compartments on a side of the cover facing the second panel, wherein the cover is movable between a closed position in face-to-face adjacent relationship with the second panel and an open position for providing access to the one or more storage compartments.

19. The vehicle of claim 18, wherein the second panel comprises a first aperture formed therein that is configured to allow a light mounted to the vehicle interior roof extend therethrough.

20. The vehicle of claim 19, wherein the cover comprises a second aperture formed therein and wherein a light mounted to the interior roof can illuminate the vehicle interior when the cover is in the closed position, and wherein the light can illuminate the one or more storage compartments in the cover when the cover is in the open position.

21. The vehicle of claim 19, wherein the cover comprises a second aperture formed therein and wherein the light extends through the second aperture when the cover is in the closed position.

22. The vehicle of claim 20, wherein the cover comprises a translucent lens disposed within the second aperture.

23. A vehicle, comprising:
   an interior roof having a headliner attached thereto;
   a light attached to the interior roof; and an overhead storage apparatus attached to the interior roof, comprising:
   a panel secured to the interior roof, wherein the panel comprises a first aperture formed therein, and wherein the light extends through the first aperture; and
   a cover pivotally mounted to the panel and comprising one or more storage compartments on a side of the cover facing the panel, wherein the cover is movable between a closed position in face-to-face adjacent relationship with the panel and an open position for providing access to the one or more storage compartments, wherein the cover comprises a second aperture formed therein, wherein the light can illuminate the vehicle interior through the second aperture when the cover is in the closed position, and wherein the light can illuminate the one or more storage compartments in the cover when the cover is in the open position.

24. The vehicle of claim 23, wherein the cover comprises a translucent lens disposed within the second aperture.

25. The vehicle of claim 23, wherein the light extends through the second aperture when the cover is in the closed position.

26. A vehicle, comprising:
   an interior roof having a headliner attached thereto; and
   an overhead storage apparatus attached to the interior roof, comprising:
      a panel secured to the interior roof;
      a light secured to the panel; and
      a cover pivotally mounted to the panel and comprising one or more storage compartments on a side of the cover facing the panel, wherein the cover is movable between a closed position in face-to-face adjacent relationship with the panel and an open position for providing access to the one or more storage compartments, wherein the cover comprises an aperture formed therein, and wherein the light can illuminate the vehicle interior through the aperture when the cover is in the closed position and can illuminate the one or more storage compartments in the cover when the cover is in the open position.

27. The vehicle of claim 26, wherein the cover comprises a translucent lens disposed within the second aperture.

28. The vehicle of claim 26, wherein the light extends through the aperture when the cover is in the closed position.

29. The overhead storage apparatus of claim 1, wherein the second panel comprises one or more projections extending therefrom, wherein each projection is configured to support articles suspended therefrom.

30. The overhead storage apparatus of claim 9, wherein the panel comprises one or more projections extending therefrom, wherein each projection is configured to support articles suspended therefrom.

* * * * *